United States Patent

[11] 3,564,977

| [72] | Inventor | Allen Van Cleve Davis<br>5600 Alta Canyada, La Canada, Calif. 91011 |
|---|---|---|
| [21] | Appl. No. | 717,817 |
| [22] | Filed | Apr. 1, 1968 |
| [45] | Patented | Feb. 23, 1971 |

[54] TORQUELESS COMPRESSION SEAL
8 Claims, 4 Drawing Figs.

[52] U.S. Cl. .................................................. 92/101,
29/484, 200/83, 251/61
[51] Int. Cl. ...................................................... F01b 19/00
[50] Field of Search ............................................ 285/225,
286; 251/61; 92/98, 101, 103; 200/83; 29/484,
446, 447, 450, 451, 493, 497.5

[56] References Cited
UNITED STATES PATENTS

| 2,811,168 | 10/1957 | Davies et al. ................ | 251/61X |
| 2,832,573 | 4/1958 | Rees............................... | 251/61X |
| 2,932,321 | 4/1960 | Mercier......................... | 92/98X |
| 2,992,652 | 7/1961 | Fellberg ........................ | 92/103X |
| 3,049,931 | 8/1962 | Lang, Jr. et al. ............... | 92/103X |
| 3,135,173 | 6/1964 | Jack, Jr. ........................ | 92/101X |
| 3,325,191 | 7/1967 | Yates ............................ | 285/286X |

*Primary Examiner*—John F. Campbell
*Assistant Examiner*—Ronald J. Shore
*Attorney*—Perry E. Turner

ABSTRACT: Plastic film in disc form is seated on a support in an opening of equal diameter in a metal body. A second metal body extending into the opening has an annular end rib abutting the film near its periphery. The two metal bodies are welded by parent metal, such welding being effected while the bodies are axially pressed together, and which upon solidifying holds the bodies drawn together. A fluid-tight mechanical seal is thus formed between the plastic film and the parts between which it is sandwiched.

PATENTED FEB 23 1971

3,564,977

INVENTOR.
ALLEN V. C. DAVIS
BY Perry E. Turner
ATTORNEY

TORQUELESS COMPRESSION SEAL

BACKGROUND OF THE INVENTION

1. Field of the Invention

This invention relates to a method and means for providing a fluidtight compression seal.

2. Description of the Prior Art

Compression seals are known to have been formed by threading body parts together to clamp a sealing element between confronting portions of such parts. However, the action of turning parts together in this fashion causes the surfaces of the sealing element to be damaged. In this connection, the opposite surfaces of the sealing element are subjected to oppositely directed circumferential friction forces as the parts are turned and tightened, and such forces cause abrasion. In addition, where the sealing element is fairly thin, such oppositely directed forces cause the center of the element to buckle and wrinkle.

SUMMARY OF THE INVENTION

The invention embraces a seal formed of a sealing element that is clamped between confronting portions of parts which are welded together by parent metal, wherein the weld upon solidifying draws the parts together with great force to effect a leakproof seal between the element and the parts between which it is clamped. By this construction and method, I provide a seal which eliminates the possibility of abrasion and wrinkling of the surfaces of the sealing element as is occasioned when torquing the parts together.

DESCRIPTION OF THE PREFERRED EMBODIMENTS

Figure 1:
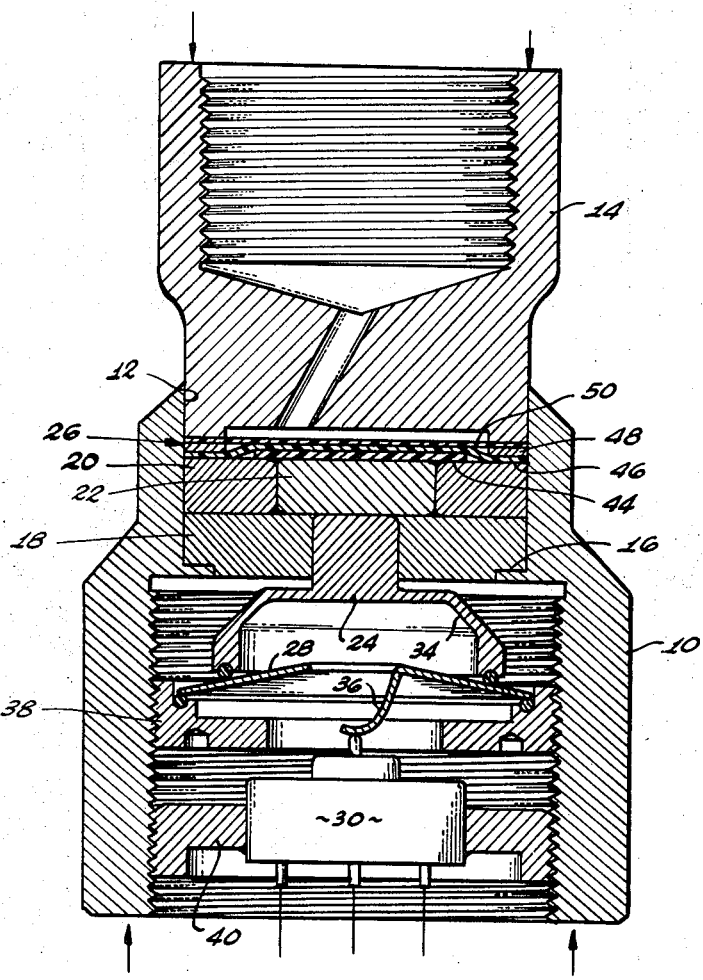
FIG. 1 is a longitudinal sectional view of a pressure switch, showing the parts assembled preparatory to forming the seal of my invention.

Referring to FIG. 1, there is shown a pressure switch in which the housing has a lower metal body 10 that has a smooth central bore 12 in its upper end, and an upper metal body 14 that slidably fits in the bore 12. The lower end of the bore 12 terminates in an annular shoulder 16, on which is seated an annular metal disc 18 having a central aperture. A metal ring 20 is placed on the upper surface of the disc 18, and has an inner diameter greater than that of the aperture in the disc 18. A metal disc 22 is slidably disposed in the ring 20. Preferably, the elements 18, 20 and 22 are sufficiently thick as to constitute rigid elements.

The disc 22 is engaged by the upper end of a plunger 24 that is slidable in the aperture in the disc 18. Through diaphragm means 26 overlaying the ring 20 and disc 22, the pressure of fluid in the upper body portion 14 acts on the disc 22 and plunger 24 to operate a Belleville spring 28 that controls a switch 30. The details of construction of the parts of such a switch do not form essential parts of my invention. However, these parts and their operations will be sufficiently described to facilitate an understanding of the utility of my invention.

As illustrated, the length of the plunger 24 is somewhat greater than the thickness of the disc 18. Extending from the lower end of the plunger 24 is a cup 34, the end of which engages the upper surface of the spring 28. The spring has a tongue extension 36 that engages the plunger of the switch 30.

As will be noted, the lower body 10 is internally threaded, and the periphery of the spring 28 is supported on an element 38 that is threaded into the body 10. Similarly, the switch 30 is carried by an element 40 that is threaded into the body 10.

The spring 28 is preloaded by turning the element 38 into the body 10, thereby forcing the plunger 24 and the disc 22 upwardly against the diaphragm means 26 until the cup 34 bottoms against the lower surface of the disc 18. As will be seen, further turning of the element 38 preloads the spring 28. The amount of preload determines the pressure on the diaphragm means of the plunger 24 required to snap deflect the spring 28. In this connection, the element 40 is turned inwardly until the plunger of the switch 30 engages the lower end of the tongue 36. The preload on the spring 28 takes into account the resisting force of the plunger of the switch 30. When the spring snap deflects, the tongue 36 actuates the switch plunger, thereby operating the switch.

For the above-described operations, I provide a fluid-tight seal which prevents fluid entering the upper body 14 from leaking past the diaphragm means 26 into the lower body 10. To this end, and referring to FIG. 3 along with FIG. 1, I place a disc 44 of thin, flexible plastic film on top of the metal disc 22. The plastic disc 44 is of greater diameter than the disc 22. Overlaying the disc 44 is a diaphragm 46, which is also formed of a flexible plastic film. The diameter of the diaphragm 46 is substantially that of the bore 12.

A thin metal ring 48 is placed on top of the diaphragm 46, and another flexible disc diaphragm 50 of plastic film is placed on the top of the metal ring 48. The disc 44, the diaphragms 46, 50 and the metal ring 48 are all quite thin, their thicknesses being measurable in thousandths, e.g., 0.003''. The outer diameter of the ring 48 is the same as the diameters of the diaphragms 46, 50, and its inner diameter is greater than the diameter of the plastic disc 44.

For the disc 44 and diaphragms 46, 50, I prefer to use a film of plastic material that is resistant to high temperatures and to corrosion or etching by the fluids to be used, e.g., a polyimid film. All metal parts, including the ring 48, preferably are of stainless steel.

Figure 2:
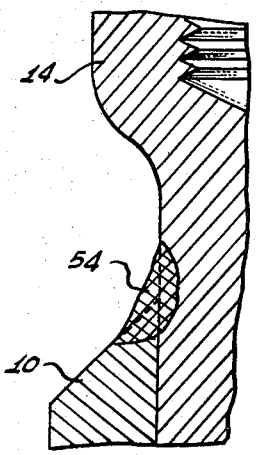
FIG. 2 is an enlarged, fragmentary sectional view of the portions of the body parts of the device of FIG. 1 which are welded together by parent metal.

With the parts assembled as shown in FIG. 1, but without the plunger 24, spring 28 and switch 30, I apply compressive force to the ends of the bodies 10, 14 while welding the bodies 10, 14 together. In this connection, and referring to FIG. 2, along with FIG. 1, I form a weld 54 of parent metal, as by tig welding, around the upper end of the body 10. As the weld metal 54 shrinks during solidification, the bodies 10, 14 are drawn tightly together, i.e., the bodies are actually telescoped as the weld metal solidifies.

Figure 3:
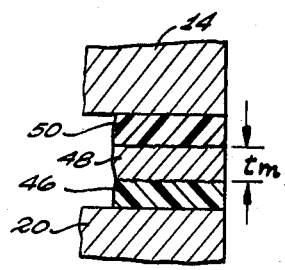
FIG. 3 is an enlarged, fragmentary sectional view of an edge portion of the parts of the seal before welding.
Figure 4:
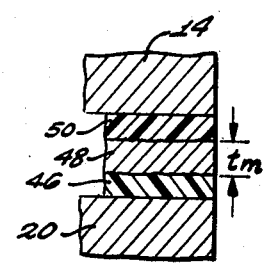
FIG. 4 is an enlarged, fragmentary sectional view of the edge portions of the parts shown in FIG. 3, after welding.

Such telescoping of the bodies as the weld 54 solidifies causes the clamped portions of the diaphragms 46, 50 to be compressed. A better understanding of this action can be seen with reference to FIGS. 3 and 4. FIG. 3 illustrates the parts as they appear before welding, wherein the diaphragms 46, 50 and metal ring 48 appear of the same thicknesses. After the weld has solidified, the clamped portions of the diaphragms 46, 50 are compressed, as shown in FIG. 4, so that the thicknesses of such portions of the diaphragms are less than the thickness of the metal ring 48. As will now be seen, the weld 54 causes the bodies 10, 14 to be drawn together so as to exert high preload force on the peripheral or rim portion of the diaphragm means, whereby a perfect fluid seal is effected between the diaphragms and the metal portions confronting the surfaces thereof while under pressures in excess of 10,000 p.s.i. applied to the fluid chamber.

Further, if desired, the opposite surfaces of the metal ring 48 may be roughened, as by a sandblasting technique. In such case, the tremendous compressive force set up by the weld 54 causes the diaphragms to be forced against the opposite surfaces of the metal ring 48 so as to firmly grip and seal the diaphragms 46 and 50. It should be apparent, however, that my invention is not limited to the use of the metal ring, or even to the use of a pair of diaphragms as described. Rather, my invention embraces the use of my diaphragm material with memory which will withstand preload pressure sealing at its periphery. Furthermore, my invention embraces and is applicable to a simple ring seal as for coupling two conduit sections together, where it is desired to insure against leakage of fluid around the seal.

Again referring to FIGS. 1 and 2, I have found it to be a distinct advantage to form the upper portion of the body 10 with a wall thickness that is substantially less than its length, and to insure that the wall is sufficiently thin to prevent any possibility that the weld 54 could cause the immediately adjacent portion of the body 10 to crack. In this connection, such portion is capable of slight elongation, i.e., spring action. Accordingly, the weld 54 upon solidifying effectively draws the body 10 upwardly along the body 14, thus accounting for the telescoping action above described.

I claim:

1. In combination:
   a pair of cylindrical metal elements having confronting annular faces;
   compressible seal means including a pair of thin film diaphragms, the outer diameters of which are substantially that of the outer diameters of said faces;
   a thin metal ring between said diaphragms and having an outer diameter substantially that of said diaphragms;
   a weld bonding said metal elements together to compress and hold said diaphragms and metal ring, and thereby form a leakproof seal, between said faces;
   a rigid disc on one side of one diaphragm, the inner diameter of said ring being greater than the diameter of said disc; and
   means normally holding said disc in a position to engage said one diaphragm, said disc being movable against said holding means in response to pressure of predetermined magnitude applied to the other diaphragm.

2. The combination of claim 1, wherein the surfaces of said ring are roughened.

3. The combination of claim 2, including:
   a plastic disc between said rigid disc and said one diaphragm, the diameter of said plastic disc being greater than the diameter of said rigid disc but less than the inner diameter of said ring.

4. In combination:
   a pair of cylindrical metal elements having confronting annular faces;
   diaphragm means having an edge portion between said faces;
   a weld bonding said metal elements together to axially compress and hold said edge portion between said faces so as to form a leakproof seal, said diaphragm means having the characteristic that prior to solidification of said weld said edge portion is not axially clamped with sufficient force to establish a leakproof seal, but that during solidification of the weld the shrinkage thereof forces said faces against said edge portion so as to form a leakproof seal;
   a rigid element supported for sliding movement on one side of said diaphragm means; and
   means normally holding said rigid element in engagement with said one side of said diaphragm means, said rigid element being movable against said holding means in response to a force of predetermined magnitude applied to the other side of said diaphragm means.

5. The combination of claim 4, wherein said edge portion of said diaphragm means includes layers of plastic and metal.

6. The combination of claim 4, wherein the force which said weld causes said faces to exert against said edge portion is substantially greater than the force of said predetermined magnitude applied to said other side of said diaphragm means for moving said rigid element against said holding means.

7. The combination of claim 6, wherein said diaphragm means includes a pair of thin plastic diaphragms; and
   a metal ring between the edge portions of said plastic diaphragms.

8. The combination of claim 4, wherein one of said metal elements in the vicinity exhibits a spring action and undergoes elongation during shrinkage of said weld.